(12) United States Patent
Lin et al.

(10) Patent No.: US 6,285,463 B1
(45) Date of Patent: Sep. 4, 2001

(54) METHOD AND APPARATUS FOR IMAGE COMPENSATION OF BLOOMING ARTIFACTS

(75) Inventors: Ying-wei Lin, Penfield; Katherine Loj, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/219,276

(22) Filed: Dec. 22, 1998

(51) Int. Cl.[7] ................ H04N 1/58; H04N 1/50
(52) U.S. Cl. ............... 358/1.9; 358/1.7; 358/300
(58) Field of Search ............... 358/1.9, 1.7, 501, 358/518, 530, 300; 347/115, 116, 131, 132, 232, 251, 252, 253, 254

(56) References Cited

U.S. PATENT DOCUMENTS

| 4,599,285 | 7/1986 | Haneda et al. . | |
|---|---|---|---|
| 4,679,929 | 7/1987 | Haneda et al. . | |
| 5,023,632 | 6/1991 | Yamamoto et al. . | |
| 5,184,226 | 2/1993 | Cianciosi | 358/296 |
| 5,252,995 | 10/1993 | Trask et al. . | |
| 5,260,799 | * 11/1993 | Loce et al. | 358/300 |
| 5,296,877 | 3/1994 | Sato . | |
| 5,450,211 | 9/1995 | Kanai et al. | 358/401 |
| 5,504,462 | 4/1996 | Cianciosi et al. . | |
| 5,519,815 | 5/1996 | Klassen . | |
| 5,561,743 | 10/1996 | Kanai et al. . | |
| 6,111,593 | * 8/2000 | Henderson et al. | 358/300 |

* cited by examiner

Primary Examiner—Scott Rogers
(74) Attorney, Agent, or Firm—Christopher D. Wait

(57) ABSTRACT

The present invention is a method and apparatus to minimize and prevent blooming problems in color image systems. Particular applicability is found where an image on image system is employed. The invention is inserted into the colorant driving signal path of the system. The invention places an averaging circuit in the path of one or more colorant driving signal streams. The averaging circuit produces an average value signal representative of a small area of its respective colorant. A modulator or other signal varying device responsive to the average value signal is placed in the path of yet another but separate colorant driving signal stream. In this manner the separate colorant driving signal is modulated or varied in response to the average neighboring value of a different color thus minimizing and preventing image blooming.

24 Claims, 3 Drawing Sheets

METHOD AND APPARATUS FOR IMAGE COMPENSATION OF BLOOMING ARTIFACTS

BACKGROUND OF THE INVENTION AND MATERIAL DISCLOSURE STATEMENT

The present invention relates to a color imaging system wherein the average of one or more colors is used to modify the saturation of another color.

Blooming is a problem resulting from constraints in intensity and misalignment tolerances as found in many imaging scenarios and types. Much of the art solving blooming problems is directed primarily toward video and CCD type cameras. However, color imaging systems such as video display monitors and print systems can also exhibit blooming problems in their output. By "blooming" we are referring to shapes in an image which exceed their intended edges or boundaries and are thus larger than desired in a manner objectionable to the human eye. Examples of blooming include, line growth and narrow white space fill in. Two important parameters affecting blooming in color systems are alignment, and saturation or intensity. The consequences of these two parameters are manifest in both color image display and color image print systems. The method and apparatus disclosed here are applicable in both such systems as is apparent to one skilled in the art. However, for purposes of discussion the focus will be upon printing systems. In particular, the discussion will focus on xerographic, electrophotographic or any other electrostatographic printing processes.

In a typical electrostatographic printing process, a photoconductive member is charged to a substantially uniform potential so as to sensitize its surface. The charged portion of the photoconductive member is exposed by a writer, for example: by light from the image of the original document, or by a raster output scanner (ROS) in the case of an electronically stored image. Exposure of the charged photoconductive member selectively dissipates charge in the irradiated areas. This renders a record, with the electrostatic latent image on the photoconductive member corresponding to the informational areas contained in the original document. After the electrostatic latent image is recorded on the photoconductive member, the latent image is developed by bringing developer material into contact with the surface of the photoconductive member. Generally, the developer material comprises toner particles adhering triboelectrically to carrier granules. The toner particles are attracted from the carrier granules to the latent image by electrostatic force thus forming a toner powder image on the photoconductive member. The toner powder image is then transferred from the photoconductive member to a copy sheet. The toner particles are heated to permanently affix the powder image to the copy sheet.

The foregoing generally describes a typical black and white electrostatographic printing machine. With the advent of multicolor electrophotography, it is desirable to use an architecture which comprises a plurality of image forming stations. One example of the plural image forming station architecture utilizes an image-on-image (IOI) system in which the photoreceptive member is recharged, reimaged and developed for each color separation, followed by a single transfer of all colors to paper. This greatly simplifies the transfer system, hence the system architecture, in comparison with a traditional system where each color is transferred to paper separately. As such, IOI machines can be single pass or multipass. In single pass IOI machines the charging, imaging, developing and recharging, reimaging and developing, etc followed by transfer to paper, are done in a single revolution of the photoreceptor. This requires multiple charging and imaging stations. In multipass IOI architectures, each color separation is formed with a single charging and imaging station but with different development stations, though still with a single transfer operation of all the colors. The single pass architecture offers a potential for much higher throughput.

In an IOI machine the second, third and fourth exposure or imaging stations need to image through prior developed toner layers, hence their intensities need to be increased. With IOI all the desired toner colors are built up on the photoreceptor before transferring to a page and fusing. The first color toner is applied in the same manner as black and white or single color electrophotography. Everywhere, the first color is applied directly to the photoreceptor. Thereafter one or more subsequent colors are applied over the first color. Where a color blend is desired, the second color toner is applied superimposed over the first color toner. Where only the second color is desired however, it is applied directly upon the photoreceptor. The result is that a subsequent color toner layer develops, in some places over the prior toner layer, and in other places directly upon the photoreceptor. This requirement creates a problem in the exposure step prior to this second toner development step. For that exposure step, the raster output scanning (ROS) level if set to the same exposure level as before, will not achieve the same photoreceptor charging levels because the laser needs to image through the first toner layer. This ultimately results in an insufficient mass of toner with attending color and saturation problems in the print. Thus there is a need to increase the ROS exposure level. However, such an increase, when applied to areas where there is no prior developed toner on the photoreceptor, means the exposure level is now too high, and this causes a "blooming" problem (i.e., line growth and narrow white space fill in).

By way of illustration, consider an IOI machine where the colors are developed in the order of yellow, magenta, and cyan. Current practice in IOI xerography calls for high ROS exposures for the cyan separation to discharge the photoreceptor to an equal voltage under magenta and yellow toner and bare photoreceptor. If two exposure powers are available, one for bare photoreceptor and one for areas with previously developed toner, one is freed from the constraint of over exposure because the bare photoreceptor exposure can be independently controlled so as to be equal to the exposure found under toner layers. This is disclosed with U.S. patent application Ser. No. 08/786,611 assigned to the present assignee and incorporated by reference herein, which teaches that such an approach is electrostatographically feasible and shows the image quality benefits which result. In that particular implementation of a multiple exposure technique, transfer of information from the previous channels to control the exposure levels when printing the next separation are utilized on a pixel by pixel basis. However, such an approach relies on near perfect alignment at each station as the photoreceptor is exposed for each color. Where misalignment exceeds one pixel width in amount, which is typical, blooming effects again become manifest. Blooming as resulting from constraints in intensity and misalignment tolerances is a problem found in many imaging scenarios and types.

U.S. Pat. Nos. 5,450,211 and 5,561,743, address as a cause of blooming the change with temperature of focal distance and attendant change of magnification (change in beam diameter). Disclosed is a copying machine for forming an image by a scanning laser beam which is emitted from an optical system on a photosensitive member. Photosensors are provided at optically equivalent positions to a beginning portion and an end portion of a scanning line on a photosensitive member. A scanning time of a laser beam in the main scanning direction is measured by these photosensors. The measured time and a standard time for a copy magnification set by an operator are compared, and a correction value is calculated, and at the same time, magnification in the main scanning direction is corrected using the correcting value. Also, focusing (adjusting of the beam diameter) is carried out using the photosensors. Each of the photosensors contains a photoelectric transfer element, and a beam which comes through a slit is incident to the element. Each photosensor is provided with two slits. One is perpendicular to the main scanning direction, and the other is inclined to the main scanning direction. The beam diameter in the main scanning direction is adjusted based on detection of the beam which comes through the slit which is perpendicular to the main scanning direction. The beam diameter in the sub scanning direction is adjusted based on detection of the beam which comes through the slit inclined to the main scanning direction.

Another approach to blooming problems is found in U.S. Pat. No. 5,519,815 relating an image processing method for reducing the amount of marking material required to print a colored image, and avoid problems common to the use of excessive amounts of ink. In a device for processing color images preparatory to printing, it provides a method of reducing marking material coverage in text and line art areas of secondary colors including the steps of: a) determining the locations of text and line art color pixels having excessive marking material coverage; b) upon determining the locations of color pixels having excessive marking material coverage, processing separation pixels to turn OFF a predetermined portion of the separation pixels corresponding to color pixels having excessive marking material coverage; and c) to prevent artifacts from occurring in the pixel reduction step, processing a given area of separation pixels in an order which tends to randomize the turn OFF effect.

U.S. Pat. No. 5,296,877 describes a multicolor printing process in which the shape and intensity of an imaging beam are changed when imaging a portion of a photoconductive element upon which toner has been deposited. Disclosed is a method of forming a multicolor image and apparatus capable of reducing the deviation between successive toner images of different colors and enhancing dot reproducibility. In the event of the second and successive sequences of steps included in a single multicolor image forming process, the intensity of a laser beam is controlled together with a beam diameter or an emission pulse width. This control is such that, when the laser beam scans part of the photoconductive element where a toner image was formed by the preceding sequence of steps, the laser beam forms a dot of substantially the same size in both the part where a toner image is present and part where a toner image is absent. This is performed in matching relation to the interception and scattering characteristics of the laser beam due to the toner image.

U.S. Pat. No. 5,252,995 describes a system in which the boundaries are enhanced between different color areas by varying the laser power. A multi-color, electrostatic, laser printing system employs a method for enhancing color representations at boundaries of pixels with different colors. The system employs a charged electrostatic surface that is selectively discharged by application of a modulated laser beam. The system performs the steps of: identifying a pixel of a first color that bounds a pixel of a second color, the first color being a secondary color; decreasing applied laser power to the electrostatic surface at the secondary color pixel site in the process of applying underprint and overprint toners to produce the secondary color; and inhibiting the decrease of applied laser power when applying the overprint toner if the second color pixel is a primary color that is the same as the color of the overprint toner of the secondary color pixel. A similar inhibition action occurs when an isolated primary color pixel or a thin pixel line is found so as to assure proper development.

U.S. Pat. No. 5,023,632 describes a method to vary the exposure between black and color toners by examining neighboring pixels around a target pixel. The logic applied here is to increase the exposure amount when all eight reference spots are in a non-exposure state, but use a reference exposure amount in any other situation. Disclosed is an electrophotographic color image forming method whereby black, yellow, magenta and cyan toner images are superimposed on a photoconductor to transfer to paper, exposure being changed between black and color in a method in which development of black is performed by a contact developing method, and development of color by a direct current electric field projection developing method. Also, in exposure for color, the exposure amount is adjusted between highlight and shadow areas. A full color image of high saturation with good balance between black and color components is reproduced by changing the exposure amount between black and color. It is also possible to obtain a color image with good reproducibility of highlight areas as well as shadow areas.

All of the background art cited above is hereby incorporated by reference.

As may be noted from the discussion above, while there are many approaches to the problem of blooming, none of them satisfactorily address misregistration or misalignment in combination with intensity. Furthermore, a two-level exposure control is too coarse an adjustment, as the compensation needed for imaging through a yellow toner layer is in general different from that required for imaging through a magenta toner layer, which is yet again different from that compensation required for imaging through the combination of both the yellow and magenta toner layers together. Therefore, it would be desirable to have a method and apparatus which solves blooming problems, by allowing appropriate adjustment of intensity without suffering from misalignment effects.

SUMMARY OF THE INVENTION

The present invention is directed to an apparatus and method for enabling full color saturation while avoiding undesirable image blooming in color systems.

In accordance with the invention, there is provided method and apparatus to allow the adjustment of a first color as depending upon the average of the pixels of another color which neighbor the first color.

The present invention relates a method averaging a first colorant signal over a small area. A signal corresponding to that average is generated as a result. That signal is utilized to modulate a second colorant signal.

The present invention relates to a combination of at least one pixel averaging circuit and a method for modifying a neighboring color pixel with a result from the averaging circuit.

The present invention relates to a combination of at least one pixel averaging circuit and a look up table, a first colorant driving signal is used as a first input address to the lookup table, a second input address is provided to the lookup table as a result of the pixel averaging circuit response to at least a second colorant driving signal; the look up table generates a code signal in response the first and second input addresses, that code signal is used to direct the modulation of a pulse width modulator.

More particularly, the present invention relates to a combination of at least two video inputs, receiving a first colorant driving signal and at least a second colorant driving signal. A pixel averaging circuit receives the first colorant driving signal, and generates a correction signal responsive thereto. A memory device storing a look up table receives for each pixel, both the correction signal and the second colorant driving signal, and in response to same, generates a code signal. Signal pulse forming electronics responsive to the code signal produce a suitable signal pulse to a writer in a printer.

The present invention also relates a method for compensating an image color in a reproduction device comprising: receiving a first colorant driving signal and at least a second colorant driving signal for a reproduction device; averaging at least the first colorant driving signal over a small area, and generating a correction signal responsive thereto; modulating at least a second colorant signal responsive to the correction signal.

DESCRIPTION OF THE INVENTION

For a general understanding of a color electrostatographic printing or copying machine in which the present invention may be incorporated, reference is made to U.S. Pat. Nos. 4,599,285 and 4,679,929, whose contents are herein incorporated by reference, which describe the image on image (IOI) process having multi-pass development with single pass transfer. Although the image compensation for blooming method and apparatus of the present invention is particularly well adapted for use in a color electrostatographic printing or copying machine, it should become evident from the following discussion, that it is equally well suited for use in a wide variety of devices including video displays terminals and is not necessarily limited to the particular embodiments shown herein.

Figure 1:
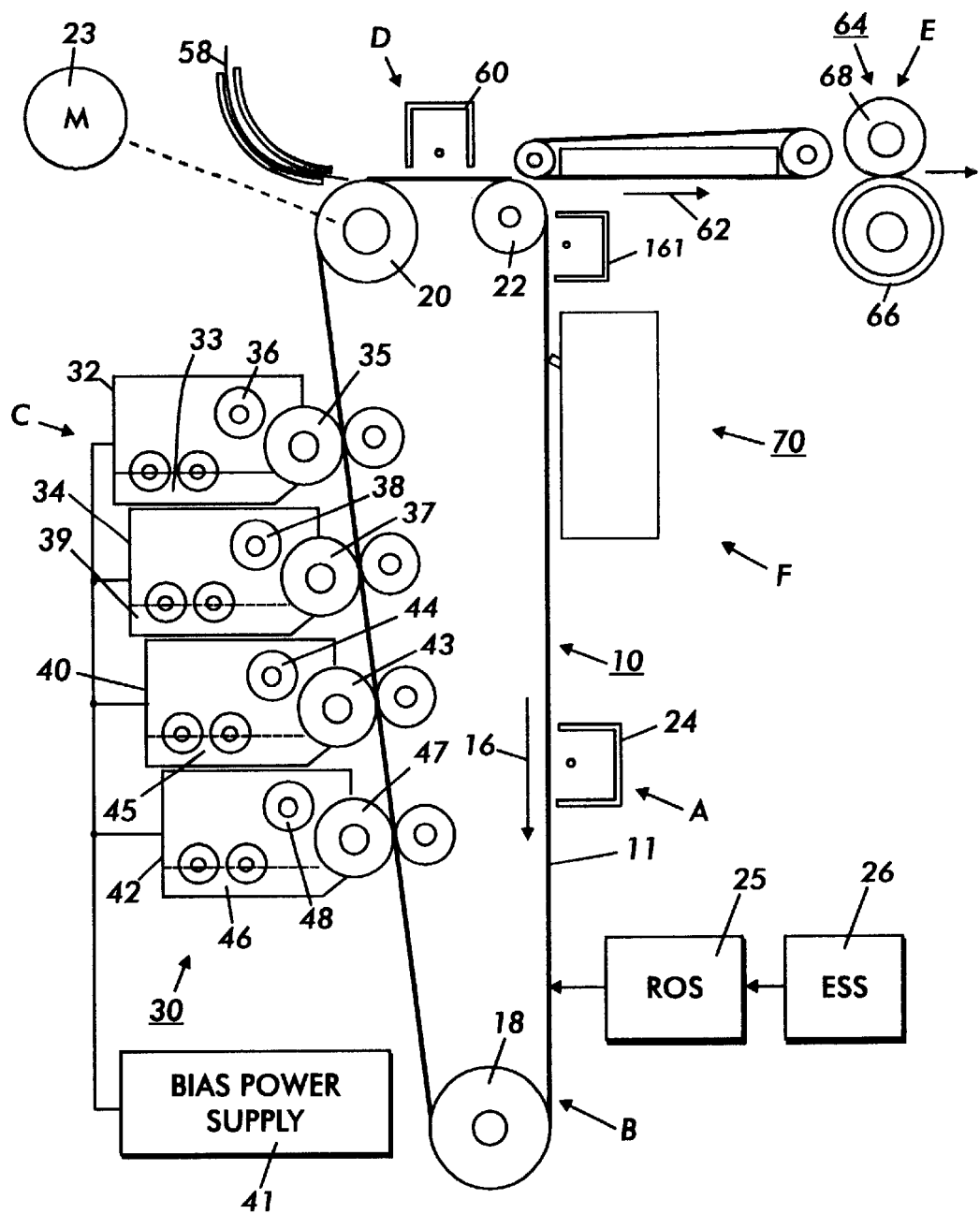
FIG. 1 is a schematic illustration of a printing apparatus incorporating the inventive features of the present invention.

Referring now to the drawings, where the showings are for the purpose of describing a preferred embodiment of the invention and not for limiting same, the various processing stations employed in the reproduction machine illustrated in FIG. 1 will be briefly described.

A reproduction machine, from which the present invention finds advantageous use, utilizes a charge retentive member in the form of the photoconductive belt 10 consisting of a photoconductive surface 11 and an electrically conductive substrate mounted for movement past charging station A, and exposure station B, developer stations C, transfer station D, fusing station E and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used to provide suitable tensioning of the photoreceptor belt 10. Motor 23 rotates roller 18 to advance belt 10 in the direction of arrow 16. Roller 20 is coupled to motor 23 by suitable means such as a belt drive.

As can be seen by further reference to FIG. 1, successive portions of belt 10 pass through charging station A. At charging station A, a corona device such as a scorotron, corotron or dicorotron indicated generally by the reference numeral 24, charges the belt 10 to a selectively high uniform positive or negative potential. Any suitable control, well known in the art, may be employed for controlling the corona device 24.

Next, the charged portions of the photoreceptor surface are advanced through exposure station B. At exposure station B, the uniformly charged photoreceptor charge retentive surface 11 is exposed to a laser based output scanning device 25 which causes the charge retentive surface 11 to be discharged in accordance with the output from the scanning device (for example, a two level Raster Output Scanner (ROS)). Electronic subsystem (ESS) 26 may store any necessary color, video or image information. The ESS 26 may be a line screen generator or may contain the driver and pulse forming circuitry for output scanning device 25 or other type of writer. The ESS 26 may also provide image correction and manipulation circuitry. Further, the ESS 26 may contain any calibration memory and circuitry.

The photoreceptor, which is initially charged to a voltage, undergoes dark decay to a voltage level. When exposed at the exposure station B it is discharged to near zero or ground potential for the image area in all colors.

At development station C, a development system, indicated generally by the reference numeral 30, advances development materials into contact with the electrostatic latent images. The development system 30 comprises first 42, second 40, third 34 and fourth 32 developer apparatuses. (However, this number may increase or decrease depending upon the number of colors, i.e. here four colors are referred to, thus, there are four developer housings.) The first developer apparatus 42 comprises a housing containing a donor roll 47, a magnetic roller 48, and developer material 46. The second developer apparatus 40 comprises a housing containing a donor roll 43, a magnetic roller 44, and developer material 45. The third developer apparatus 34 comprises a housing containing a donor roll 37, a magnetic roller 38, and developer material 39. The fourth developer apparatus 32 comprises a housing containing a donor roll 35, a magnetic roller 36, and developer material 33. The magnetic rollers 36, 38, 44, and 48 develop toner onto donor rolls 35, 37, 43 and 47, respectively. The donor rolls 35, 37, 43, and 47 then develop the toner onto the imaging surface 11. It is noted that, except the first development station 42, development stations 32, 34, 40, and any subsequent development stations must be scavengeless so as not to disturb the image formed by the previous development apparatus. All four housings contain developer material 33, 39, 45, 46 of selected colors. Electrical biasing is accomplished via power supply 41, electrically connected to developer apparatuses 32, 34, 40 and 42. The machine shown in FIG. 1 portrays a multipass architecture. Thus during the first revolution of the belt, the image station B images the first color information on the photoreceptor, and the first development station is activated; and during the second revolution of the belt, the image station B images the second color information on the photoreceptor, and the second development station is activated, etc. When all four colors are imaged and developed on the photoreceptor, the transfer station D is engaged.

Sheets of substrate or support material 58 are advanced to transfer station D from a supply tray, not shown. Sheets are fed from the tray by a sheet feeder, also not shown, and advanced to transfer station D through a corona charging device 60. After transfer, the sheet continues to move in the direction of arrow 62, to fusing station E.

Fusing station E, which permanently affixes the transferred toner powder images to the sheets, preferably includes a heated fuser roll 66 adapted to be pressure engaged with a back-up roll 68 with the toner powder images contacting fuser roll 66. In this manner, the toner powder image is permanently affixed to the sheet.

After fusing, copy sheets are directed to a catch tray, not shown, or a finishing station for binding, stapling, collating, etc., and removal from the machine by the operator. Alternatively, the sheet may be advanced to a duplex tray (not shown) from which it will be returned to the processor for receiving a second side copy. A lead edge to trail edge reversal and an odd number of sheet inversions is generally required for presentation of the second side for copying when long edge feeding of the sheets is employed. However, if overlay information in the form of additional or second color information is desirable on the first side of the sheet, no lead edge to trail edge reversal is required. Of course, the return of the sheets for duplex or overlay copying may also be accomplished manually. Residual toner and debris remaining on photoreceptor belt 10 after each copy is made, may be removed at cleaning station F with a brush, blade or other type of well known cleaning system 70. A preclean corotron 161 is located upstream from the cleaning station F.

Figure 2:
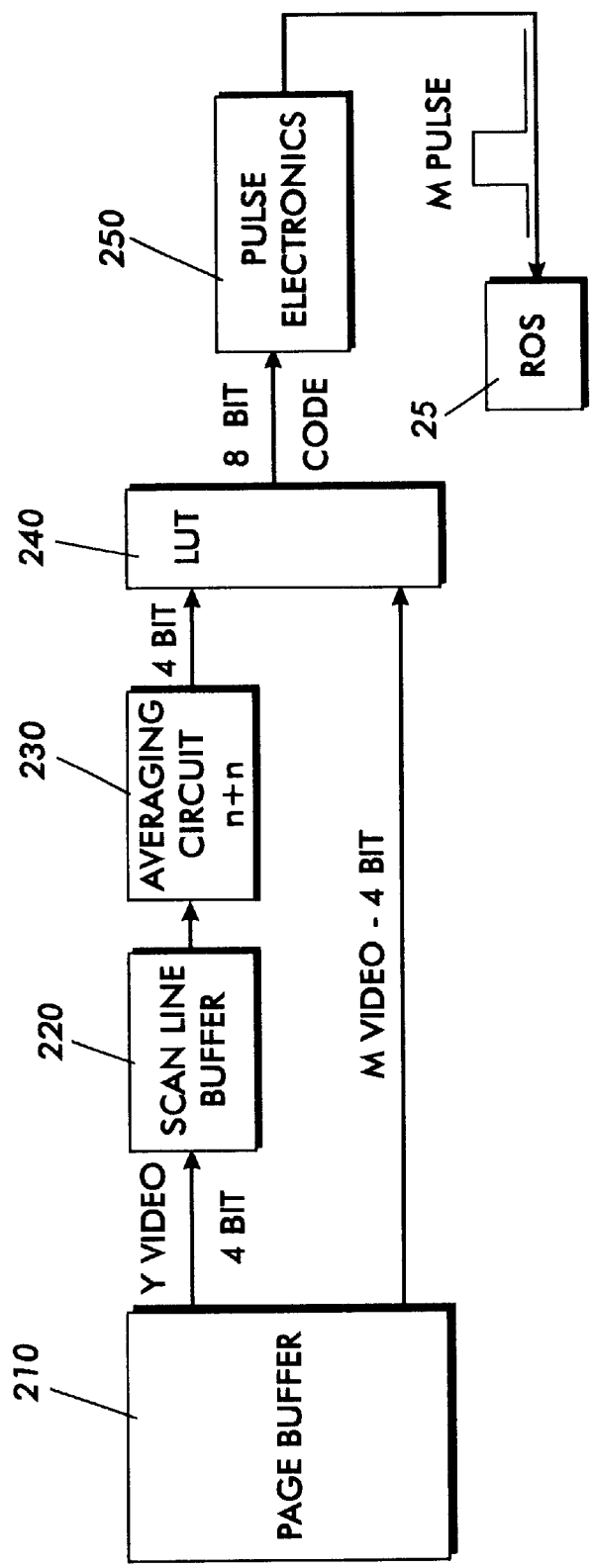
FIG. 2 is a schematic illustration of a preferred embodiment for the invention involving two video signals as an example.

Reference is now made to FIG. 2 which discloses a schematic representation for a preferred embodiment of the invention as a subset of an image on image (IOI) system. In this example IOI system the order for color development is yellow (Y), then magenta (M), then cyan (C), and finally black (B). So the first colorant driving signal is yellow (Y) pixel data. The second colorant driving signal is magenta (M), the third is cyan (C) etc. Other arrangements of order are possible. It is to be understood that in an IOI system the first color yellow (Y) as the first applied toner, will not suffer the blooming effects that subsequent applied colors will suffer because the yellow (Y) toner is not being applied on top of an earlier applied toner color. Thus it is to be understood that prior to the time of operation depicted for the preferred embodiment in FIG. 2, yellow (Y) toner has been developed on the photoconductive belt 10 for the desired yellow image, since that is when the present invention comes into play. Provided are page buffer 210, scan line buffer 220, averaging circuit 230, look up table (LUT) 240, and pulse electronics 250. Page buffer 210 is large enough to store all necessary digital information for at least one image. This includes the color information needed for each pixel in the image. The page buffer 210 may be any type of memory including RAM or disk types. However it is anticipated that most typically a hard disk storage device is used as a page buffer. At the time of operation of the subsystem depicted in FIG. 2 the desired result is an image exposed and developed through the previously developed yellow toner image upon photoconductive belt 10 as corresponding to the magenta video pixel data residing in page buffer 210.

For each pixel of magenta pixel data presented for exposure by the ROS 25, the yellow pixel data which corresponds to that magenta pixel and the eight pixels of yellow data immediately neighboring and surrounding that pixel are also provided. This equates to a 3×3 cell of nine (previously developed) yellow data pixels as centered about the magenta pixel data being processed in this preferred embodiment. Other cell sizes and arrangements are of course possible including a 1×1 cell. Of course with a 1×1 cell averaging is no longer needed. However, it has been found that the amount of misregistration may exceed one pixel and so a cell larger than 1×1 becomes desirable to avoid out of phase effects which can make the resulting image worse than if not treated at all. It will be well understood by those skilled in the art that a variety of m×n neighborhood cells may be used, where m is not necessarily equal to n, and m & n are most desirably between 1 to 9.

The page buffer 210 passes yellow video pixel data to the scan line buffer 220. In a preferred embodiment the scan line buffer 220 stores three complete scan lines. The scan line buffer 220 then provides video data for clusters of nine yellow pixels (3×3) to the averaging circuit 230. Each pixel of an image stored in page buffer 210 may be described by up to eight or more bits. In a preferred embodiment a 4 bit (one nibble) per pixel, format is utilized, as is indicated in FIG. 2.

Averaging circuit 230 digitally averages the nine nibbles of data together. A correction signal representing that average result is generated by averaging circuit 230 as a single 4-bit nibble. This operation is performed utilizing an accumulator technique, or in the alternative, adder and multiplier techniques, as is well understood in the digital arts. For a preferred embodiment this is accomplished utilizing dedicated hardware, but as is apparent by those skilled in the arts this may also be accomplished in software, if for example various speed and cost issues are addressed. The single nibble correction signal result from averaging circuit 230 is passed to look up table 240.

Look up table (LUT) 240 receives both the correction signal result from the averaging circuit 230 and the magenta (M) video pixel nibble from the page buffer 210. There are timing and race conditions here which may be addressed in number of ways. Those skilled in the art will recognize many possible solutions. For example a circuit with suitable delay may be inserted in the magenta video path between the page buffer 210 and LUT 230. Another approach would be to provide an early prefetch of the yellow video data. The scan line buffer 220 is an aid to this kind of approach acting as it does in a preferred embodiment as a cache memory. If the page buffer 210 is provided with sufficient speed and timing control the scan line buffer 220 may be eliminated altogether.

Look up table (LUT) 240 is a two dimensional memory array. The magenta video nibble and the nibble from the averaging circuit 230 operate as row and column addresses to the LUT 240, and thus point to a particular location and thereby the code contained at that location in the LUT 240. The actual value of the byte found at any given location in LUT 240 is empirically derived or produced in a calibration process so as to best reduce blooming effects without causing loss of color saturation and fidelity. Each location in the LUT 240 has, in a preferred embodiment, an eight bit byte code suitable for directing pulse electronics 250 in generating the correct pulse width, position and amplitude for a ROS 25 or other output writer. This may be effectuated in either one of three ways: the pulse may be manipulated in width; the pulse may be manipulated in amplitude or in the third alternative, the pulse may be manipulated in both width and amplitude. In a preferred embodiment the pulse is varied in width from what it would otherwise have been if based strictly upon the magenta video data. The empirically derived data stored in the LUT 240 may be burned in as static information into, for example, a ROM. However, in a preferred embodiment the LUT 240 is built of a writable non-volatile memory where the contents may be updated in a calibration process.

Pulse electronics 250 may take many forms including line screen generators, or pulse width modulation (PWM) types of circuitry, as is commonly known in the arts. In a preferred embodiment pulse electronics 250 are of the pulse width position modulation (PWPM) type. PWPM techniques are well known in the art. Exemplary examples of which are provided in U.S. Pat. Nos. 5,184,226 and 5,504,462 both incorporated by reference herein.

Figure 3:
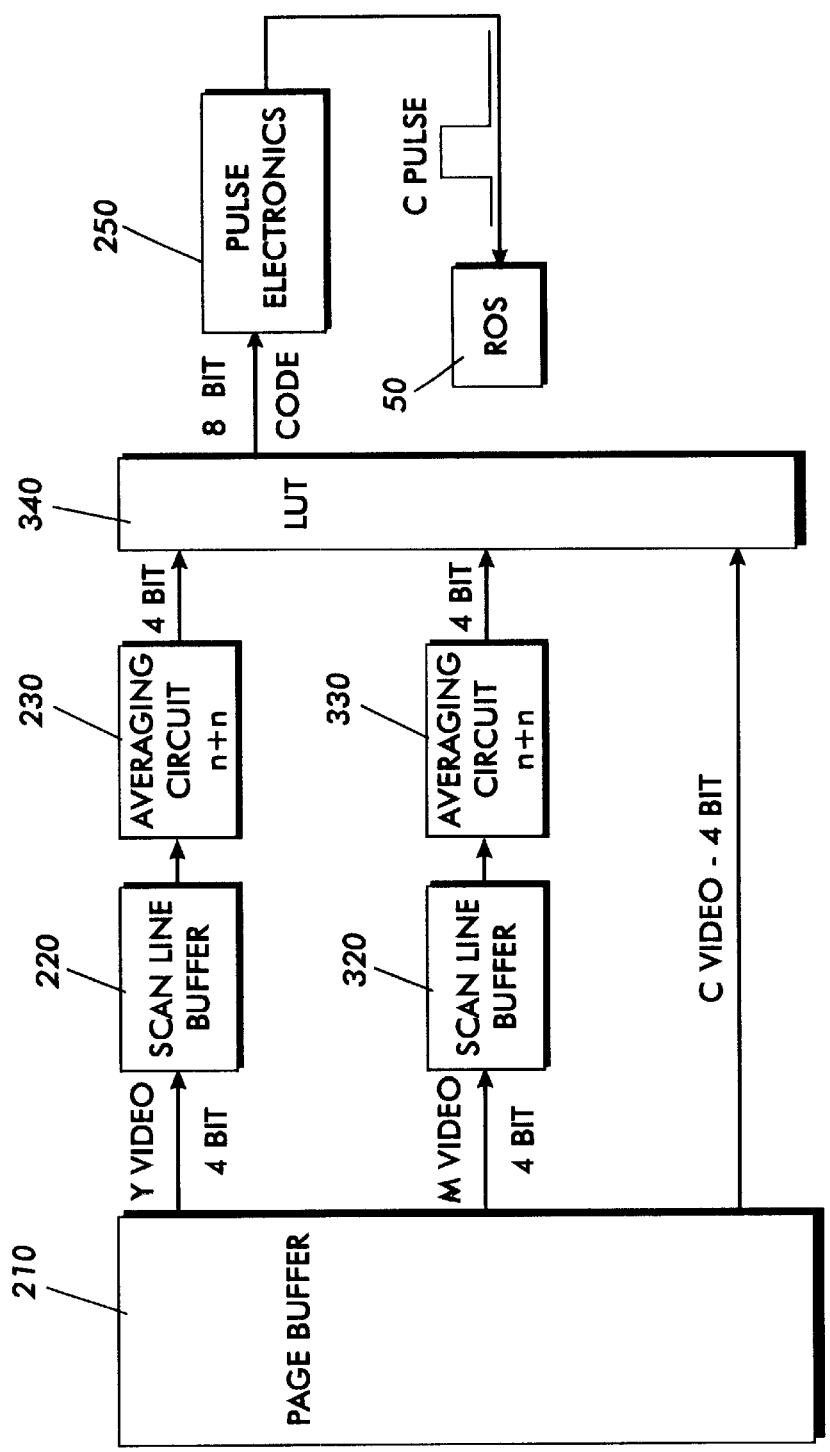
FIG. 3 is a schematic illustration of a further preferred embodiment for the invention involving three color video signals.

FIG. 3 depicts a further example of a preferred embodiment where there are two prior developed colors to be accounted for in the prevention of blooming effects. As before page buffer 210 provides yellow (Y) video data to scan line buffer 220. The scan line buffer 220 provides a 3×3 cell of video pixels to the averaging circuit 230. Averaging circuit 230 calculates a four bit value which is passed on to LUT 340. LUT provides an eight bit code to the pulse electronics 250 which then generate a suitable pulse to the ROS 50.

What is added here to the subsystem of FIG. 3 which is different from the subsystem of FIG. 2, is an additional scan line buffer 320 for the magenta (M) video pixels received from the page buffer 210. The other addition is an additional averaging circuit 330 for generating a four bit average for a 3×3 cell of magenta pixels. Like the output of averaging circuit 230, this nibble from additional averaging circuit 330 is also passed to LUT 340. LUT 340 differs here from LUT 240 in FIG. 2, in that it operates as a three dimensional memory array and as such accepts three address for access to a given memory location. The first and second nibbles from averaging circuits 230 and 330 provide the first two addresses. The third address is provided from the page buffer 210 as the cyan (C) video data. The byte of code thus addressed from the contents of LUT 340 and provided to pulse electronics 250 represents an empirically derived modification for the given cyan video data in response to the underlying yellow and magenta images and thereby the yellow and magenta toners that may already be present there at that given location on the photoreceptor.

In view of the above, it is therefore apparent that there has been provided a method and apparatus for enabling full color saturation while avoiding undesirable image blooming in color systems. While the embodiment disclosed herein is preferred, it will be appreciated from this teaching that various alternative, modifications, variations or improvements therein may be made by those skilled in the art, which are intended to be encompassed by the following claims:

What is claimed is:

1. A blooming compensator for a color imaging system comprising:
   at least two video inputs, receiving a first colorant driving signal and at least a second colorant driving signal;
   a pixel averaging circuit receiving the first colorant driving signal, and generating a correction signal responsive thereto;
   a memory device storing a look up table and receiving for each pixel, both the correction signal and the second colorant driving signal, and in response to same, generating a code signal;
   signal pulse forming electronics responsive to the code signal to produce a suitable signal pulse to an output writer in the color imaging system.

2. The blooming compensator of claim 1, wherein the signal pulse forming electronics is a pulse width modulator.

3. The blooming compensator for an image on image printer of claim 1, wherein the signal pulse forming electronics is a pulse width position modulator.

4. The blooming compensator of claim 1, wherein the signal pulse forming electronics is a line screen generator.

5. The blooming compensator of claim 1, wherein the pixel averaging circuit employs a m×n matrix cell for averaging pixels over a corresponding area.

6. The blooming compensator of claim 1, wherein the pixel averaging circuit employs a three by three matrix cell for averaging pixels over a corresponding area.

7. The blooming compensator of claim 1, wherein the writer is a raster output scanner.

8. A blooming compensator for an image on image printer comprising:
   at least two video inputs, receiving a first colorant driving signal and at least a second colorant driving signal;
   a pixel averaging circuit receiving the first colorant driving signal, and generating a correction signal responsive thereto;
   a memory device storing a look up table and receiving for each pixel, the correction signal, and in response to same, generating a code signal;
   signal pulse forming electronics responsive to the code signal and to the second colorant driving signal to produce a suitable signal pulse to a ROS in the image on image printer.

9. The blooming compensator for an image on image printer of claim 8, wherein the suitable signal pulse is modulated in pulse width by the signal pulse forming electronics.

10. The blooming compensator for an image on image printer of claim 8, wherein the suitable signal pulse is modulated in amplitude by the signal pulse forming electronics.

11. The blooming compensator for an image on image printer of claim 8, wherein the suitable signal pulse is modulated in both pulse width and amplitude by the signal pulse forming electronics.

12. The blooming compensator for an image on image printer of claim 8, wherein the signal pulse forming electronics is a pulse width modulator responding to the second colorant driving signal by modulating the suitable signal pulse in width and responding to the code signal by varying the suitable signal pulse in amplitude.

13. The blooming compensator for an image on image printer of claim 8, wherein the signal pulse forming electronics is a pulse width position modulator responding to the second colorant driving signal by modulating the suitable signal pulse in width and responding to the code signal by varying the suitable signal pulse in amplitude.

14. The blooming compensator for an image on image printer of claim 8, wherein the signal pulse forming electronics is a line screen generator.

15. The blooming compensator for an image on image printer of claim 8, wherein the pixel averaging circuit employs a three by three matrix cell for averaging pixels over a corresponding area.

16. The blooming compensator for an image on image printer of claim 8, wherein the pixel averaging circuit employs a two by two matrix cell for averaging pixels over a corresponding area.

17. The blooming compensator for an image on image printer of claim 8, wherein the writer is a raster output scanner.

18. A method for compensating an image color in a reproduction device comprising:
   receiving a first colorant driving signal and at least a second colorant driving signal for a reproduction device;
   averaging at least the first colorant driving signal over a small area, and generating a correction signal responsive thereto;
   modulating at least a second colorant signal responsive to the correction signal.

19. The method for compensating an image color in a reproduction device of claim 18, wherein the small area is greater than one pixel.

20. The method for compensating an image color in a reproduction device of claim 18, wherein the small area is a three by three matrix of pixels.

21. The method for compensating an image color in a reproduction device of claim 18, wherein the averaging is accomplished with dedicated hardware.

22. The method for compensating an image color in a reproduction device of claim 18, wherein the averaging is accomplished with software.

23. The method for compensating an image color in a reproduction device of claim 18, wherein the modulating affects the amplitude of the second colorant signal.

24. The method for compensating an image color in a reproduction device of claim 18, wherein the modulating affects the pulse width of the second colorant signal.

* * * * *